Jan. 27, 1970  P. B. ELZEY  3,491,914
EXPANDED PLASTIC CONTAINER HAVING RIGID INTERNALLY
PRESS-FIT COVER
Filed June 7, 1968  2 Sheets-Sheet 1
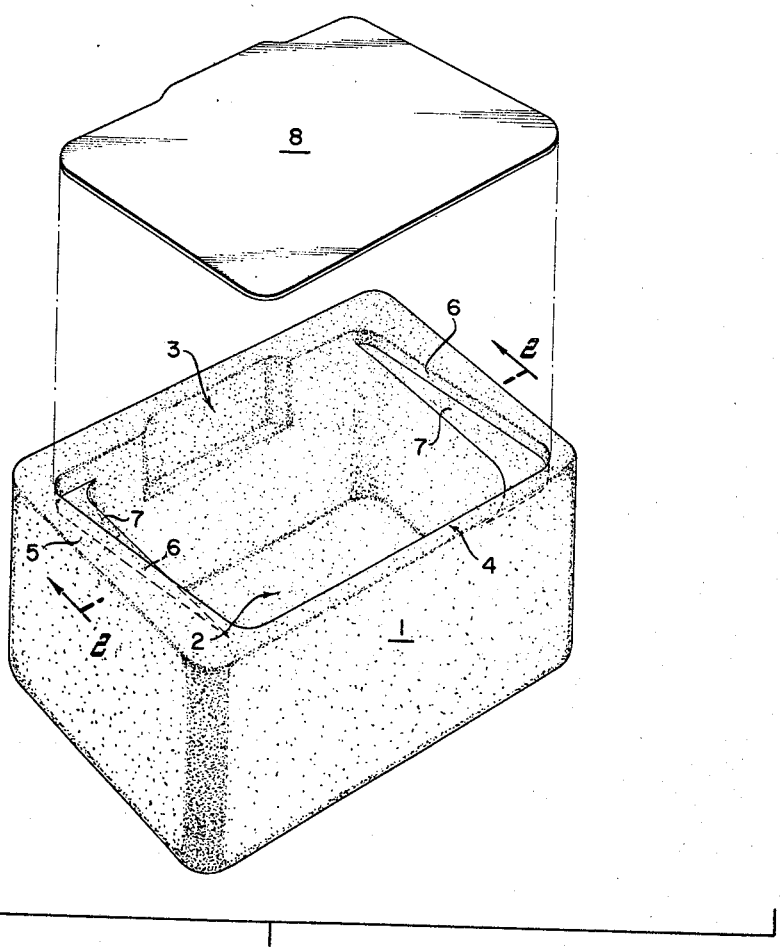
Fig.1
Fig.2
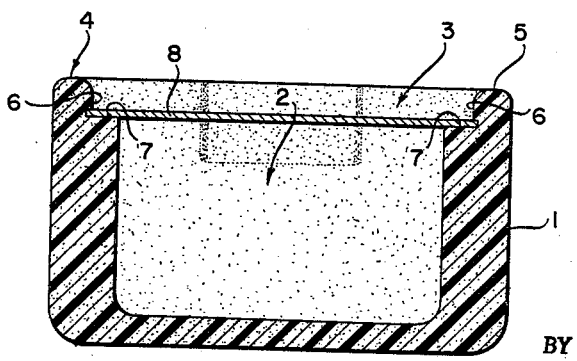
Paul B. Elzey
INVENTOR
BY Hueschen & Kurlandsky
ATTORNEY Jan. 27, 1970  P. B. ELZEY  3,491,914
EXPANDED PLASTIC CONTAINER HAVING RIGID INTERNALLY
PRESS-FIT COVER
Filed June 7, 1968  2 Sheets-Sheet 2
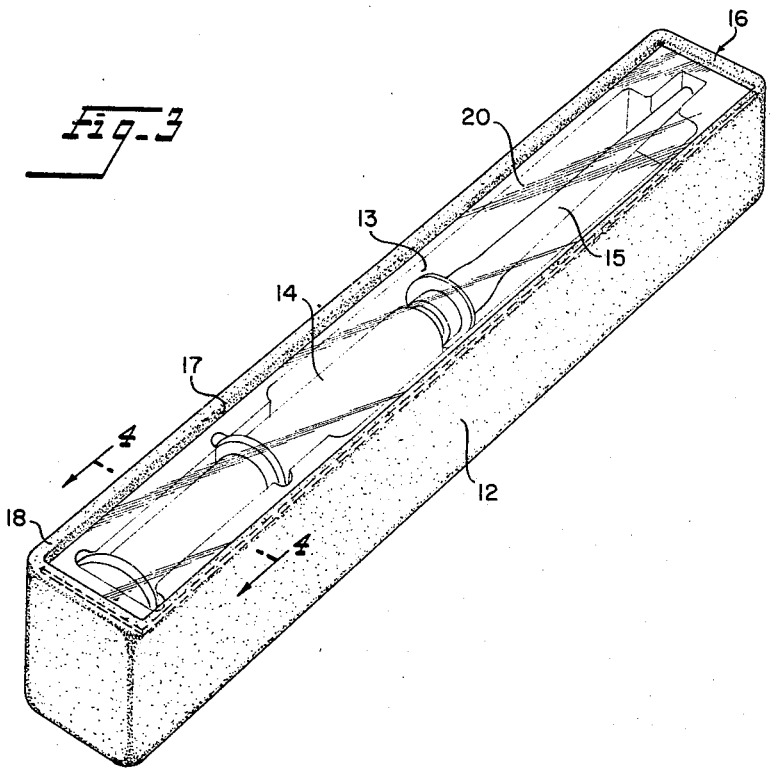
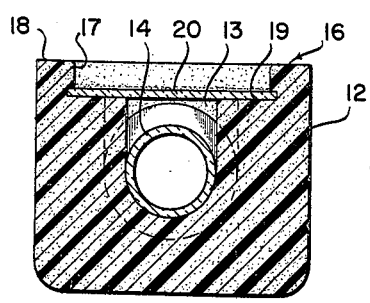
Paul B. Elzey
INVENTOR
BY Hueschen & Kurlandsky
ATTORNEY United States Patent Office 3,491,914
Patented Jan. 27, 1970

3,491,914
EXPANDED PLASTIC CONTAINER HAVING RIGID INTERNALLY PRESS-FIT COVER
Paul B. Elzey, Kalamazoo, Mich., assignor to Kalamazoo Plastics Company, Kalamazoo, Mich., a corporation of Michigan
Filed June 7, 1968, Ser. No. 735,432
Int. Cl. B65d 43/10, 25/54, 25/18
U.S. Cl. 220—60                                     3 Claims

ABSTRACT OF THE DISCLOSURE

A molded expanded plastic container having a chamber provided therein and having an opening at one face or side thereof, the perphery at the opening being recessed to provide a flange and a supporting ledge, and a complementary sheet-form lid adapted to be inserted inside the flange and in contact engagement with the ledge, the lid being of such shape and dimensions and having sufficient rigidity so that it may be inserted within the flange in a press-fit and supported by the ledge, thereby being securely retained in place.

BACKGROUND OF THE INVENTION

The present invention relates to molded containers, and is more particularly concerned with a container of molded expanded plastic, as for example one molded of expanded polystyrene foam, and having means provided wherein a lid may be inserted and securely retained without external retaining means.

Containers formed of molded expanded plastic such as polystyrene are known in the art. However, such structures have been provided with lids or covers which may be inserted over the open face of the container but which are not adapted to be secured thereto without external means.

SUMMARY OF THE INVENTION

It is an object of the present invention to provide a combination comprising a molded container of expanded plastic material having an open side or face and a complementary lid. It is a further object of the invention to provide a combination of the type described which may be simply formed and wherein the lid may be simply inserted at the open side of the container and secured thereto without external means. It is still another object to provide a structure of the type described wherein the lid is so securely engaged by the container that the combination is tamper-proof, and wherein removal of the lid provides observable evidence, even when the lid is reinserted, that it has at one time been removed. The accomplishment of the foregoing and additional objects will become more fully apparent hereinafter.

According to the invention, a container is provided which is prepared from molded expanded plastic, as for example polystyrene foam. The container is provided with a chamber and an open face having its inner wall recessed to provide a flange and ledge arrangement. A sheet-form lid is provided therefor of material such as paperboard or plastic. The lid is shaped to fit within the flange and is so dimensioned that a tight press fit is formed when the lid is inserted within the flange. The lid is supported by the ledge and of sufficient rigidity so that the periphery of the lid bites into or compresses the wall of the flange to form a tamper-proof structure in which the lid cannot be removed without damaging the wall of the flange sufficiently so that the damage is readily observable as evidence that the lid has previously been removed.

BRIEF DESCRIPTION OF THE DRAWINGS

The invention in its preferred embodiments is illustrated by the accompanying drawings in which:

FIG. 1 is a perspective view of a container according to the invention together with a complementary lid.

FIG. 2 is a cross-sectional view taken at the line 2—2 of FIG. 1, with the lid shown in position.

FIG. 3 is a perspective view of a container with lid in place according to the invention, and having an article positioned therein; and FIG. 4 is an enlarged cross-sectional view taken at the line 4—4 of FIG 3.

DESCRIPTION OF THE PREFERRED EMBODIMENTS

Reference is now made to the accompanying drawings for a better understanding of the invention, wherein all the parts are numbered and wherein the same numbers are used to refer to corresponding parts throughout.

Referring to FIGS. 1 and 2, a container and complementary lid according to the invention are shown. The container comprises a body portion 1 having a chamber 2 and an open side 3. The walls of the enclosure are recessed to provide a flange having a distal surface 5 which is coplanar with the open face of the container, and a proximal surface 6 substantially perpendicular thereto. A ledge 7 perpendicular to the proximal surface 6 is also provided along portions of the periphery. The lid comprises a body portion 8 of generally sheet-form shape. The lid is so dimensioned that, when it is inserted within the flange 4, it engages and is supported by the ledge 7, and the edge of the lid engages the proximal surface 6 of the flange in a tight press-fit. It is particularly advantageous to dimension the lid so that the fit is so tight that the edge of the lid compresses or bites into the proximal surface 6 sufficiently to cause a slight groove or even a fracture to be formed therein, shown in FIG. 2 in exaggerated condition, thereby providing positive retention of the lid. When such retention is obtained, the enclosure may be said to be tamper-proof, since the lid cannot be removed without in some way damaging the proximal wall 6 of the flange or otherwise leaving evidence that the lid has at one time been inserted and subsequently removed.

FIGS. 3 and 4 illustrate an embodiment of the invention wherein the cavity or chamber of the container is contoured so as to provide a protective fit for a fragile object, in this case a hypodermic needle assembly. The container comprises a body portion 12 having a chamber or cavity 13 so contoured as to provide protective support for a hypodermic needle 14 in combination with a needle guard 15 retained therein. The edge of the chamber wall is recessed to provide a flange 16 having a proximal surface 17 and a distal surface 18. Additionally, a ledge 19 is provided over substantially the entire periphery of the flange. A transparent lid 20 is positioned between the flange walls with its edge engaging the proximal surface 17 in a press-fit, with the edge biting into the proximal wall sufficiently to provide positive engagement therewith as shown in FIG 4 in exaggerated condition. The surface of the lid is also in engagement with and supported by the ledge 19. The lid is securely held between the flanges and cannot be removed without observable damage to at least the proximal wall 17, which damage serves as an indication that the lid has at one time been inserted and then removed, thereby rendering the combination tamper-proof.

The ledge in both embodiments shown serves as a support for the lid and is in operative engagement therewith. In the embodiment of FIGS. 3 and 4, the lid is in actual contact engagement with the ledge. In other embodiments, as for example in the embodiment shown in FIGS. 1 and 2, the article to be contained in the chamber may have a flange which engages and is supported by the ledge. In such case, the lid rests on the opposite surface of the flange of the article and is directly suported thereby. However, as used herein, the term "operatively engaging" is intended to denote both arrangements, that is, one wherein the lid gains its support by actual contact with the ledge, and the other wherein it gains its support by direct contact with the flange of an article being retained within the container which flange is in turn directly in contact with the ledge. In either case, the ledge provides actual support for the lid, either directly or indirectly.

The container may be molded of any of numerous different materials. The preferred materials are expanded rigid or semi-rigid plastics such as polystyrene, phenolic, or polyurethane foams. The preferred foam is polystyrene foam. The raw material is generally available in the form of expandable beads which, upon heating in a mold, e.g., a steam-heated or electrically heated mold, expand to many times their original proportions and coalesce at their interfaces to form a rigid, light, coherent foamed material.

The lid may be formed of any material which has sufficient stiffness or rigidity to retain its form, particularly lateraly. Among suitable materials are paperboard, sheet metal, or plastic sheet. Transparent plastic sheets such as those of polyethylene, polypropylene, polystyrene, or acrylic resins including resins such as butadiene-acrylonitrile-styrene resins, are particularly suited for many applications where it is advantageous to be able to view the contents of the container when the lid is closed.

The container and complementary lid combination of the present invention has many advantages. The container may be prepared from an inexpensive material, such as expanded polystyrene or other plastic foam, which is light and offers protective cushioning against breakage. The lid or cover may be readily cut or molded from any suitably rigid material. Insertion and positive retention are readily accomplished in a single step by dimensioning the lid properly to provide a press-fit with one or more walls of the flange, the friction and force resulting from the press-fit distorting the expanded foam and providing positive retention when the lid is seated upon the ledge of ridge. The lid may be formed of a transparent material to permit viewing of the contents. As a further advantage, the chamber of the container may be properly contoured during the molding process to provide a form-fitting seat for the article to be contained in the chamber of the container. The assembly of the present invention has a further advantage in that it is tamper-proof since, once the lid has been inserted into the opening between the flanges in a press-fit, it is virtually impossible to remove it without destroying or damaging the expanded material around the edge of the opening by prying off the cover or without destroying the cover itself. Additionally, the container and lid may be formed from inexpensive materials and with relatively simple machinery.

It is to be understood that the invention is not limited to the exact details of construction, operation, or exact maerials or embodiments shown and described, as obvious modifications and equivalents will be apparent to one skilled in the art, and the invention is therefore to be limited only by the scope of the appended claims.

I claim:
1. In combination, a molded substantially rigid container of expanded plastic and a complementary sheet-form lid, said container being provided with a chamber adapted to have an article contained therein, said chamber being contoured to provide a protective fit about said article, the inner wall of said container being recessed at said open face to provide a peripheral flange having proximal and distal surfaces and an inner peripheral ledge having its surface spaced below the distal surface of said flange and extending along at least a portion of said peripheral flange, said lid being so contoured, of sufficient rigidity, and so dimensioned that, when inserted within said flange, the periphery of said lid operatively engages said ledge and the edge thereof bites into the proximal wall of said flange sufficiently to deform said wall and to provide positive securement for said lid.

2. A combination according to claim 1 wherein said container is formed of expanded polystyrene foam.

3. A combination according to claim 2, wherein said lid is formed of a transparent material.

References Cited
UNITED STATES PATENTS 2,767,754  10/1956  Lederer et al. _____ 220—60
3,288,278  11/1966  Rich et al. _____ 206—46

GEORGE T. HALL, Primary Examiner

U.S. Cl. X.R.

150—5; 206—46; 215—51; 220—9, 82